United States Patent
Yamazaki et al.

(10) Patent No.: US 8,994,894 B2
(45) Date of Patent: Mar. 31, 2015

(54) LIQUID CRYSTAL DISPLAY DEVICE

(75) Inventors: Sachiko Yamazaki, Chiba (JP); Ikuko Imajo, Chiba (JP); Masashi Baba, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 315 days.

(21) Appl. No.: 13/455,876

(22) Filed: Apr. 25, 2012

(65) Prior Publication Data

US 2012/0274871 A1    Nov. 1, 2012

(30) Foreign Application Priority Data

Apr. 26, 2011    (JP) ................. 2011-098703

(51) Int. Cl.
G02F 1/1335    (2006.01)
F21V 7/04    (2006.01)
H01R 3/00    (2006.01)

(52) U.S. Cl.
CPC .... G02F 1/133608 (2013.01); G02F 1/133605 (2013.01); G02F 2201/54 (2013.01)
USPC ............... 349/61; 349/67; 349/113; 362/609; 362/612; 362/613; 362/623; 362/655

(58) Field of Classification Search
CPC .... G02B 6/0068; G02B 5/136; G02B 17/002; G02B 17/006; G02B 26/0833; G02B 5/0284; G02B 5/0808; G02B 5/12; G02B 6/005; G02F 1/133553; G02F 2203/02; G02F 1/133603; G02F 1/133604; G02F 1/133605
USPC ............. 349/61, 67, 113; 362/609, 612–613, 362/623, 555, 559, 560
See application file for complete search history.

(56) References Cited

U.S. PATENT DOCUMENTS

| | | |
|---|---|---|
| 5,040,868 A | 8/1991 | Waitl et al. |
| 6,601,970 B2 | 8/2003 | Ueda et al. |
| 2004/0208003 A1 | 10/2004 | Kuo |
| 2005/0162869 A1* | 7/2005 | Kanatsu ............. 362/632 |
| 2007/0009820 A1* | 1/2007 | Ueda ................. 430/65 |
| 2007/0047225 A1* | 3/2007 | Sudo ................. 362/225 |
| 2007/0121343 A1* | 5/2007 | Brown ............... 362/612 |
| 2007/0211205 A1 | 9/2007 | Shibata |
| 2007/0247833 A1 | 10/2007 | Lee et al. |
| 2008/0007938 A1* | 1/2008 | Chou et al. .......... 362/97 |
| 2008/0030653 A1* | 2/2008 | Lee et al. ........... 349/67 |
| 2010/0073914 A1 | 3/2010 | Park et al. |
| 2010/0079977 A1 | 4/2010 | Lee et al. |
| 2011/0044024 A1* | 2/2011 | Kim et al. .......... 362/84 |
| 2011/0122349 A1* | 5/2011 | Amimoto et al. ....... 349/113 |
| 2011/0317095 A1* | 12/2011 | Shimizu ............ 349/62 |

FOREIGN PATENT DOCUMENTS

JP    2007-286627    11/2007

* cited by examiner

*Primary Examiner* — Hoan C Nguyen
(74) *Attorney, Agent, or Firm* — Hamre, Schumann, Mueller & Larson, P.C.

(57) ABSTRACT

In a liquid crystal display device including a backlight unit that irradiates the entire image formation region with light from light emitting diodes disposed in a concentrated manner, in order to reduce warpage of a reflection sheet to obtain uniform illumination, provided is a liquid crystal display device (1), including: a liquid crystal panel (3); a reflection sheet (6), which is disposed on a rear surface side of the liquid crystal panel (3) and is curved so as to have a concave surface facing the liquid crystal panel (3); a light emitting diode substrate on which a plurality of light emitting diodes (14) are disposed along a horizontal direction; and a support (21) for fixing the reflection sheet (6) at a curved portion of the reflection sheet (6).

11 Claims, 13 Drawing Sheets

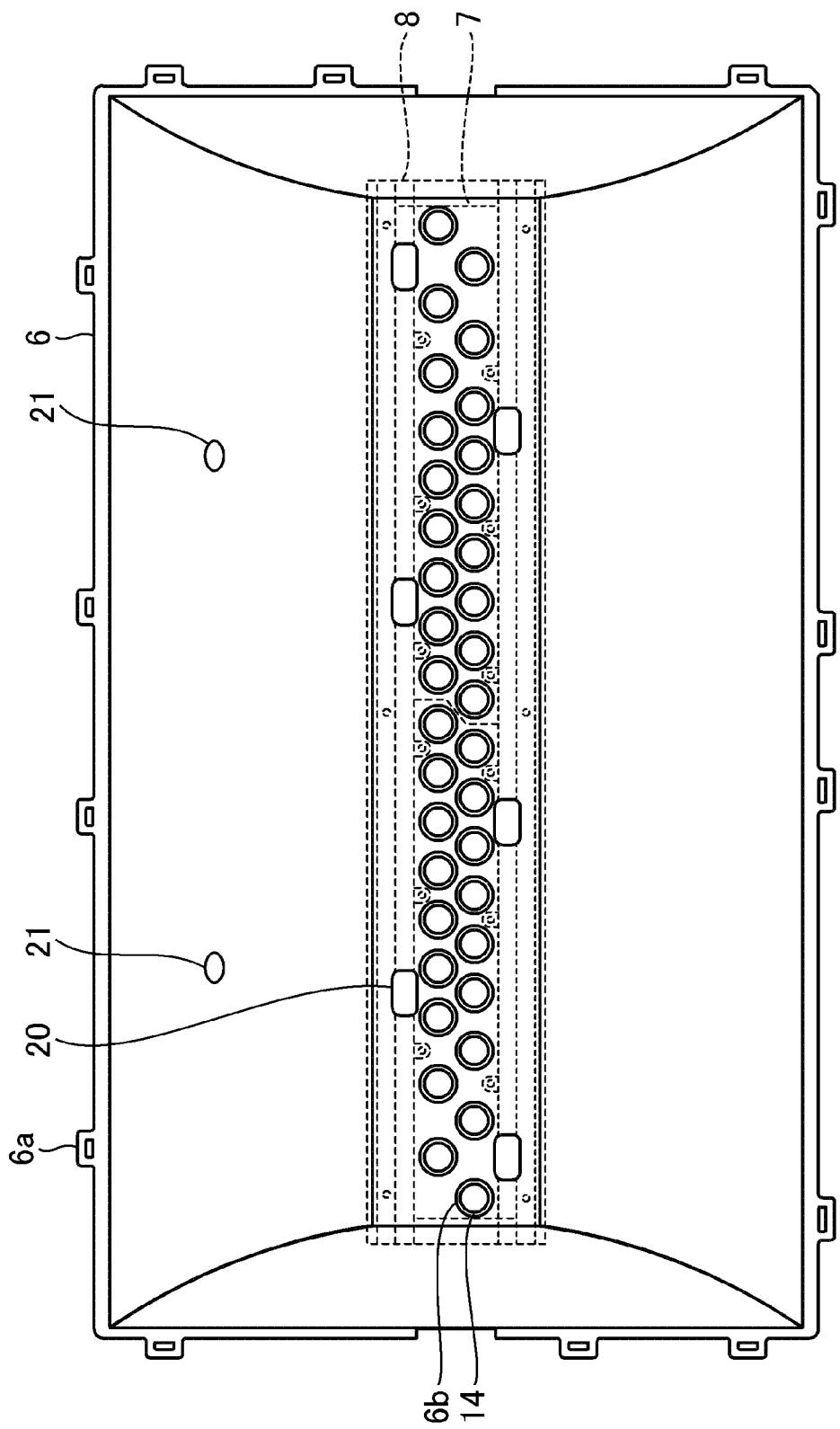

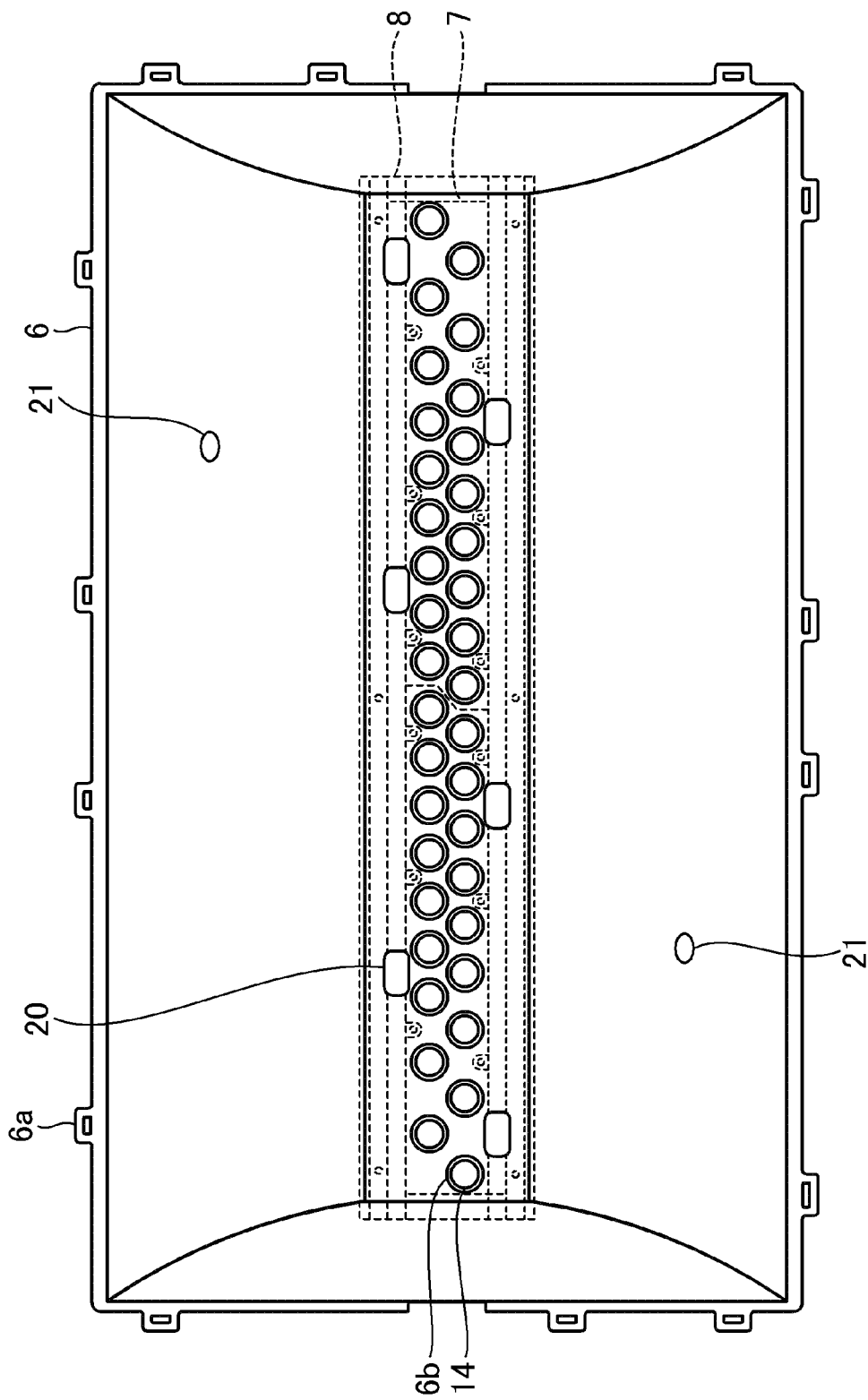

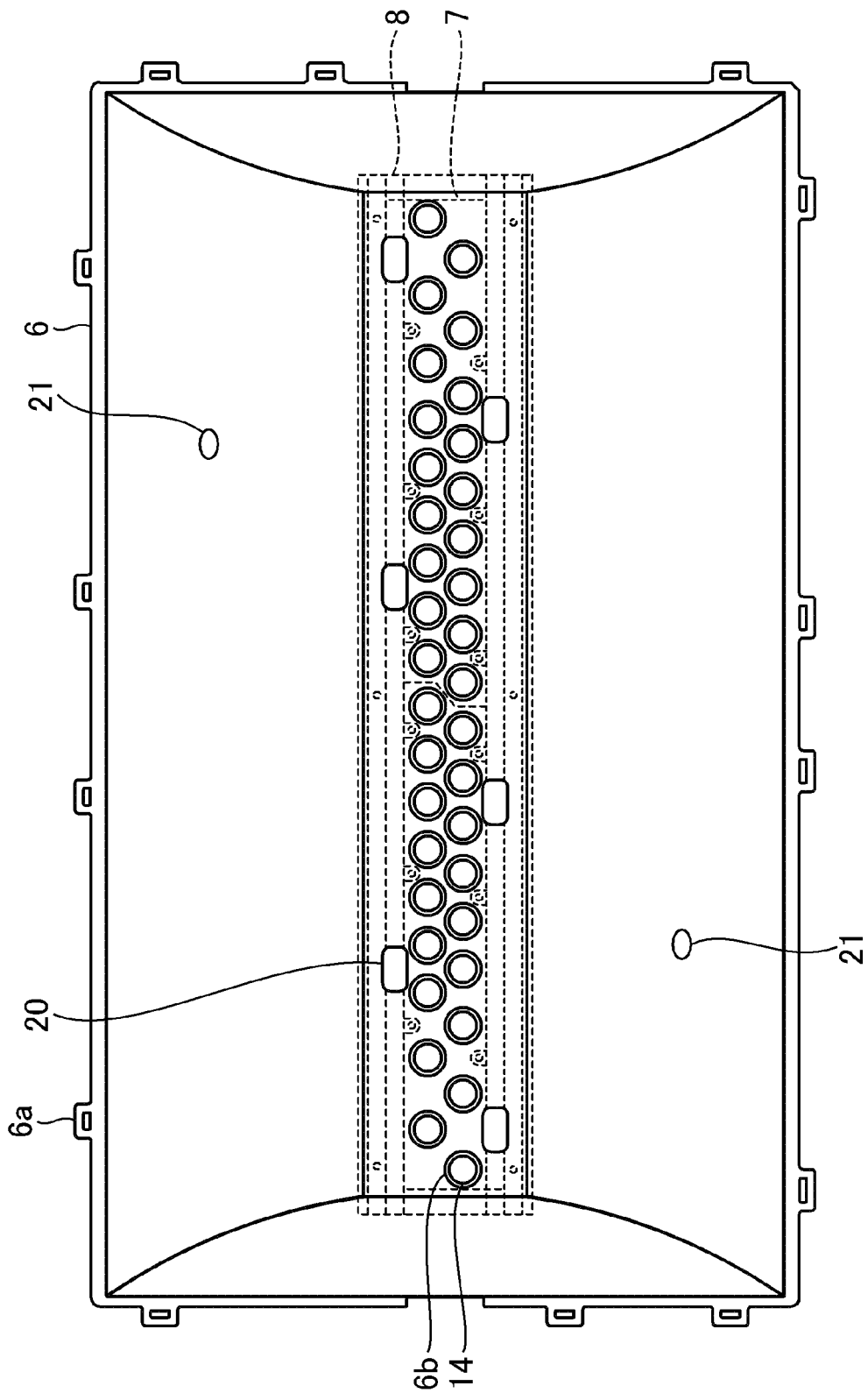

LIQUID CRYSTAL DISPLAY DEVICE

CROSS-REFERENCE TO RELATED APPLICATION

The present application claims priority from Japanese application JP 2011-098703 filed on Apr. 26, 2011 the content of which is hereby incorporated by reference into this application.

BACKGROUND OF THE INVENTION

1. Field of the Invention

The present invention relates to a liquid crystal display device.

2. Description of the Related Art

Japanese Patent Application Laid-open No. 2007-286627 discloses a liquid crystal display device including a direct type backlight unit. In the liquid crystal display device, a plurality of light emitting diodes are used as light sources of the backlight unit. The light emitting diodes are disposed in matrix across an entire region of the backlight unit.

In the liquid crystal display device described in Japanese Patent Application Laid-open No. 2007-286627, the light emitting diodes are disposed across the entire region of the backlight unit, and hence the size of a substrate on which a large number of light emitting diodes are disposed needs to be large enough to cover the entire region of the backlight unit. This increases cost for preparing a large number of light emitting diodes as well as a material cost of the substrate on which the light emitting diodes are to be disposed.

To address the problem, it is conceivable to dispose the light emitting diodes in a concentrated manner in a part of the backlight unit, for example, in the vicinity of the center of the backlight unit in the short side direction, along the long side direction of the backlight unit so that light beams emitted from the light emitting diodes are reflected or diffused so as to irradiate an entire image formation region of the rear surface of the liquid crystal panel with light beams.

There are various methods of reflecting or diffusing light beams emitted from the light emitting diodes. However, in a method using a light guide plate or a method using a plane lens such as a Fresnel lens, manufacturing cost of the light guide plate or the Fresnel lens is high and the weight increases as well. Therefore, the applicant of the present invention has studied a method of reflecting/diffusing light beams with the use of a reflection sheet which is curved so as to have a concave front surface, that is, a concave surface facing the liquid crystal panel. According to this method, the manufacturing cost can be suppressed and the weight can be reduced.

However, for example, in the case where the liquid crystal display device is used for a large-size television set, the size of the liquid crystal panel also increases, and hence the reflection sheet is warped, and it is difficult to irradiate the entire image formation region of the rear surface of the liquid crystal panel with light beams uniformly.

SUMMARY OF THE INVENTION

The present invention has been made in view of the above-mentioned circumstances, and has an object of reducing warpage of a reflection sheet to obtain uniform illumination in a liquid crystal display device including a backlight unit that irradiates an entire image formation region with light from light emitting diodes that are disposed in a concentrated manner.

Representative embodiments of the invention disclosed herein are briefly outlined as follows.

(1) There is provided a liquid crystal display device, including: a liquid crystal panel; a reflection sheet, which is disposed on a rear surface side of the liquid crystal panel and is curved so as to have a concave surface facing the liquid crystal panel; a light emitting diode substrate on which a plurality of light emitting diodes are disposed along a horizontal direction; and a support for fixing the reflection sheet at a curved portion of the reflection sheet.

(2) In the liquid crystal display device according to the above-mentioned item (1): the reflection sheet includes: an upper curved portion positioned on an upper side of the plurality of light emitting diodes; and a lower curved portion positioned on a lower side of the plurality of light emitting diodes; and the support is provided in at least one of a region in an upper half of the upper curved portion in a height direction and a region in a lower half of the lower curved portion in the height direction.

(3) In the liquid crystal display device according to the above-mentioned item (1) or (2): the reflection sheet includes: an upper curved portion positioned on an upper side of the plurality of light emitting diodes; and a lower curved portion positioned on a lower side of the plurality of light emitting diodes; and a distance of the support disposed at the upper curved portion from a lower end of the upper curved portion is equal to or smaller than a distance of the support disposed at the lower curved portion from an upper end of the lower curved portion.

(4) In the liquid crystal display device according to any one of the above-mentioned items (1) to (3): the liquid crystal display device further includes an outer frame which is disposed on a rear surface side of the reflection sheet; and the support is fixed to the outer frame.

(5) In the liquid crystal display device according to any one of the above-mentioned items (1) to (3): the liquid crystal display device further includes: an outer frame which is disposed on a rear surface side of the reflection sheet; and a reinforcing member which is mounted on the outer frame on a side facing the liquid crystal panel; and the support is fixed to the reinforcing member.

(6) In the liquid crystal display device according to any one of the above-mentioned items (1) to (5): the support includes: a support shaft which passes through an opening provided in the reflection sheet; and an expanded width portion which is provided at an edge of the support shaft; and the expanded width portion is exposed on a front surface of the reflection sheet.

(7) In the liquid crystal display device according to the above-mentioned item (6): the liquid crystal display device further includes an optical sheet which is disposed on the rear surface side of the liquid crystal panel; and the support further includes a support column, which extends from the expanded width portion in a direction facing the liquid crystal panel, for supporting the optical sheet.

(8) In the liquid crystal display device according to the above-mentioned item (7), the support column has a tapered shape in which a cross-sectional area thereof decreases toward the liquid crystal panel.

(9) In the liquid crystal display device according to the above-mentioned item (8), the support column has a conical shape.

(10) In the liquid crystal display device according to any one of the above-mentioned items (7) to (9), in a state in which the optical sheet is free from restriction, the optical sheet is warped so as to have a concave surface facing the liquid crystal panel.

(11) In the liquid crystal display device according to any one of the above-mentioned items (6) to (10), the support is white.

According to the invention disclosed herein, it is possible to reduce warpage of the reflection sheet to obtain uniform illumination in the liquid crystal display device including the backlight unit that irradiates the entire image formation region with light from the light emitting diodes that are disposed in a concentrated manner.

BRIEF DESCRIPTION OF THE DRAWINGS

In the accompanying drawings:

FIG. 10A is a view illustrating an arrangement example of the supports;

FIG. 10B is a view illustrating another arrangement example of the supports;

FIG. 10C is a view illustrating still another arrangement example of the supports.

DETAILED DESCRIPTION OF THE INVENTION

Hereinafter, a first embodiment of the present invention is described with reference to the accompanying drawings.

Figure 1:
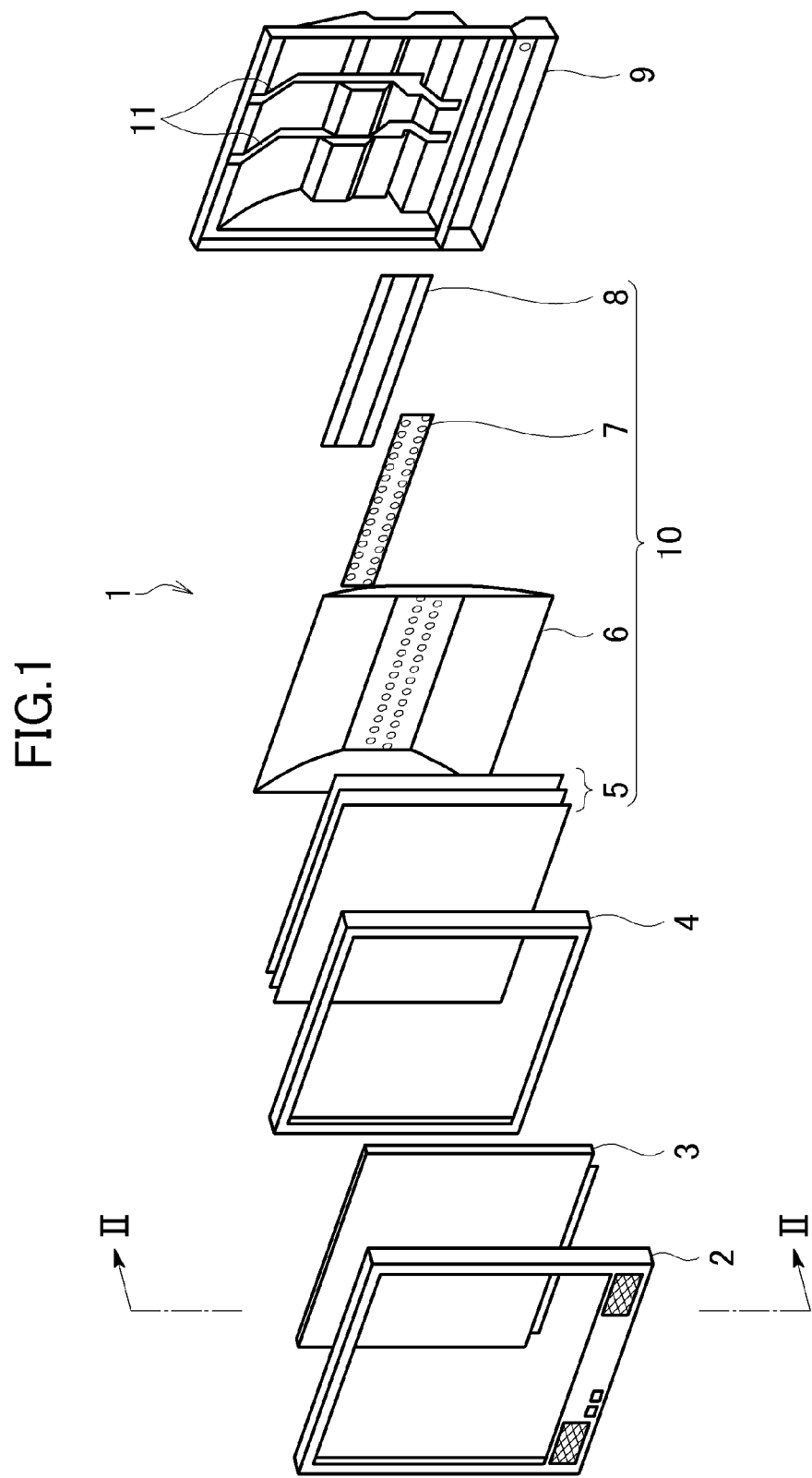
FIG. 1 is an exploded perspective view of a liquid crystal display device according to a first embodiment of the present invention.

FIG. 1 is an exploded perspective view of a liquid crystal display device 1 according to this embodiment. As illustrated in FIG. 1, the liquid crystal display device 1 is assembled by arranging, in order from the front side, an upper frame 2, a liquid crystal panel 3, an intermediate frame 4, an optical sheet 5, a reflection sheet 6, a light emitting diode substrate 7, a radiator plate 8, and a lower frame 9. Note that, the optical sheet 5, the reflection sheet 6, the light emitting diode substrate 7, and the radiator plate 8 together constitute a backlight unit 10 that functions as a planar light source for illuminating the liquid crystal panel 3 from the rear surface side thereof. The upper frame 2 and the lower frame 9 constitute an outer frame serving as an exterior of the liquid crystal display device 1. A reinforcing member 11 is provided on the inner side of the lower frame 9, that is, on the side facing the liquid crystal panel 3. The reinforcing member 11 is not essential, but is provided for the purpose of securing the strength when the liquid crystal display device 1 is mounted onto a stand or a wall surface by being supported from the rear surface thereof. The reinforcing member 11 is provided with screw holes for mounting, which are in conformity to the Flat Panel Monitor Physical Mounting Interface (FPMPMI) standard defined by the Video Electronics Standard Association (VESA), typically called VESA mount. The lower frame 9 is provided with openings so that the screw holes provided in the reinforcing member 11 may be exposed, and hence the liquid crystal display device 1 can be fixed by screws on a VESA FPMPMI standard compatible stand or the like. Any material can be used for the reinforcing member 11 as long as the strength is on a practical level. In this embodiment, steel is used. Note that, FIG. 1 illustrates only structural components of the liquid crystal display device 1 and omits other components such as a control board and a speaker.

Figure 2:
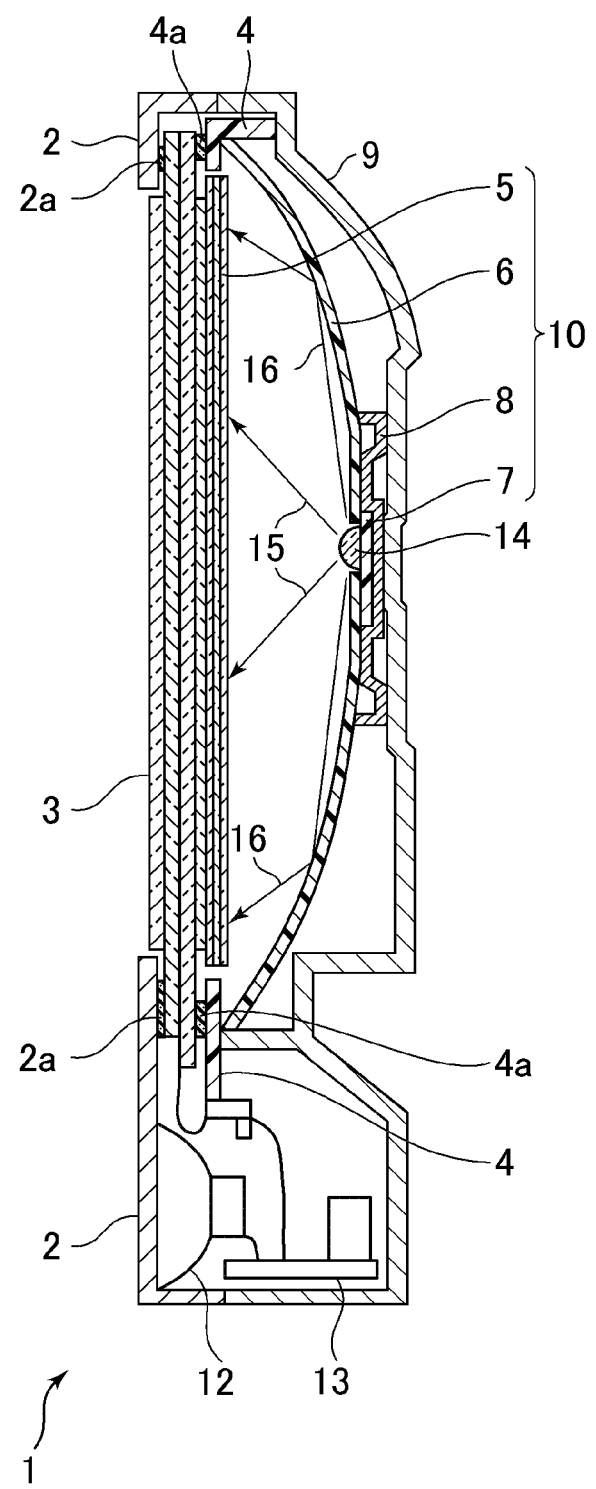
FIG. 2 is a schematic cross-sectional view of the liquid crystal display device taken along the line II-II of FIG. 1.

FIG. 2 is a schematic cross-sectional view of the liquid crystal display device 1 taken along the line II-II of FIG. 1. FIG. 2 illustrates a schematic cross-section of the assembled liquid crystal display device 1. As illustrated in FIG. 2, the liquid crystal display device 1 is structured to store the liquid crystal panel 3 and the backlight unit 10 in the outer frame formed of the upper frame 2 and the lower frame 9. The intermediate frame 4 is provided between the liquid crystal panel 3 and the backlight unit 10 so that the liquid crystal panel 3 and the backlight unit 10 are retained independently. The left side in FIG. 2 is the side where a user observes an image, which is hereinafter referred to as front side, and the surface facing the front side is referred to as front surface. The opposite side of the front side is referred to as rear surface side, and the surface facing the rear surface side is referred to as rear surface.

Note that, the liquid crystal display device 1 exemplified in this embodiment is a television set. Therefore, the liquid crystal display device 1 includes components for functioning as a television set, such as a speaker 12 illustrated in FIG. 2. Further, a control board 13 illustrated in FIG. 2 includes a power supply, a control circuit for the liquid crystal panel 3, and a control circuit for the backlight unit 10, as well as a circuit such as a tuner for receiving television broadcast. Note that, the liquid crystal display device 1 is not necessarily a television set, and may be a computer monitor, for example. In such case, the liquid crystal display device 1 may omit the components for functioning as a television set.

The upper frame 2 and the lower frame 9 constitute a housing for storing the liquid crystal panel 3 and the backlight unit 10, and it is preferred that the upper frame 2 and the lower frame 9 be formed of a lightweight material having high rigidity. Examples of the material that maybe used for the upper frame 2 and the lower frame 9 are metals, such as a steel plate, an aluminum alloy, and a magnesium alloy, FRP, and various kinds of synthetic resins. It is particularly preferred that the lower frame 9 be formed of a material having high heat conductivity in order to dissipate the heat generated due to light emission of light emitting diodes 14 efficiently, which is conducted from the light emitting diode substrate 7 via the radiator plate 8. In this embodiment, a steel plate is used. The material of the upper frame 2 may be the same as that of the lower frame 9 or may be different, and can be determined as appropriate considering the size, intended use, appearance, weight, and other factors of the liquid crystal display device 1.

A buffer 2a is provided on the surface of the upper frame 2 facing the liquid crystal panel 3, so as to mitigate the shock occurring when the liquid crystal panel 3 swings due to vibration or the like and comes in contact with the upper frame 2. As the buffer 2a, an appropriate rubber, resin, sponge, or the like is used. It is to be understood that the support and buffer structure of the liquid crystal panel 3 described herein is an example.

The intermediate frame 4 is a member that retains the liquid crystal panel 3 and the backlight unit 10 independently in a separate manner. On the front surface of the intermediate frame 4, a buffer 4a is provided so as to mitigate the shock occurring when the liquid crystal panel 3 swings and comes in contact with the intermediate frame 4. As the buffer 4a, an appropriate rubber, resin, sponge, or the like is used. Note that, the structure of the intermediate frame 4 described herein is an example. The intermediate frame 4 may employ any structure that appropriately supports the liquid crystal panel 3 and the backlight unit 10, and may be omitted as occasion demands.

The material of the intermediate frame 4 is not particularly limited, either, but it is preferred to use a synthetic resin in terms of moldability and cost. In this embodiment, polycarbonate is used in terms of strength, but the material is not always limited thereto. As in fiber reinforced plastic (FRP), a reinforcing material may be mixed into a synthetic resin. It is also preferred that the intermediate frame 4 have light blocking effect and therefore be in black or dark color. The coloring of the intermediate frame 4 may be attained by a black or dark color material itself or by coating the surface of the intermediate frame 4. In this embodiment, the intermediate frame 4 is obtained by molding polycarbonate that is colored in black or dark color.

The backlight unit 10 includes the optical sheet 5, the reflection sheet 6, the light emitting diode substrate 7, and the radiator plate 8. The light emitting diode substrate 7 of this embodiment is an elongated substrate on which the plurality of light emitting diodes 14 are mounted in line, and is provided so that a longitudinal direction of the light emitting diode substrate 7 is aligned with a horizontal direction, which is a longitudinal direction of the liquid crystal display device 1. The light emitting diode substrate 7 is fixed to the radiator plate 8. The reflection sheet 6 is a member for reflecting light from the light emitting diodes 14 to irradiate the rear surface of the liquid crystal panel 3 with light uniformly. The reflection sheet 6 has a curved cross-section as illustrated in FIG. 2. With such shape, light beams from the light emitting diodes 14 enter the optical sheet 5 directly as indicated by arrows 15 of FIG. 2 or enter the optical sheet 5 after reflected by the reflection sheet 6 as indicated by arrows 16 of FIG. 2.

The reflection sheet 6 and the optical sheet 5 each have the size corresponding to the liquid crystal panel 3. Therefore, the liquid crystal panel 3 is illuminated with light uniformly from the rear surface side thereof. Here, the light emitting diode 14 includes a light emitting diode element and a lens which is disposed on the front surface side of the light emitting diode element. The light emitting diode element of this embodiment is a so-called light emitting diode package in which a light emitting diode chip is sealed with a sealing resin, and is mounted onto the light emitting diode substrate 7. However, this is not a limitation, and as another example, a light emitting diode chip may be formed directly on the light emitting diode substrate 7. The lens is an optical component for diffusing light beams emitted from the light emitting diode element so as to obtain illumination with uniform brightness over a display region of the liquid crystal panel 3.

The reflection sheet 6 has the size corresponding to the liquid crystal panel 3 as described above, and has a curved shape to be recessed as viewed from the front surface side. The reflection sheet 6 is provided with holes at positions at which the light emitting diodes 14 are disposed, so as to expose the light emitting diodes 14 to the front surface side of the reflection sheet 6. The material of the reflection sheet 6 is not particularly limited, and a white reflection sheet using a PET resin or the like or a mirror finish reflection sheet maybe used. In this embodiment, a white reflection sheet is used. The optical sheet 5 is an optical film including at least a diffusion sheet for diffusing light entering from the light emitting diodes 14. The optical sheet 5 may include, in addition to the diffusion sheet, other optical films such as a prism sheet for refracting light beams toward the front surface side.

The light emitting diode substrate 7 is an elongated substrate on which the plurality of light emitting diodes 14 are mounted. The plurality of light emitting diodes 14 are disposed along the horizontal direction, that is, a direction parallel to the long sides of the liquid crystal display device 1. Note that, in this embodiment, the light emitting diodes 14 are disposed in two rows in a staggered manner. However, how to array the light emitting diodes 14 is not particularly limited as long as the light emitting diodes 14 are disposed along the horizontal direction. The light emitting diodes 14 may be arrayed in a single row or in three or more rows, or may be arrayed in other ways. As to the size of the light emitting diode substrate 7, the length in the horizontal direction thereof is slightly shorter than the length of the liquid crystal panel 3 in the horizontal direction, specifically about 70% to 80% in this embodiment. The length in the vertical direction thereof is shorter than the length of the liquid crystal panel 3 in the vertical direction, preferably half the length or less, and about 10% to 20% in this embodiment. Further, the material of the light emitting diode substrate 7 is not particularly limited as long as the material is an insulating material, and the light emitting diode substrate 7 may be formed of an insulating material such as glass epoxy, paper phenol, and paper epoxy or may be formed of a metal with insulating coating. Further, the above-mentioned specific dimensions of the light emitting diode substrate 7 are an example, and may be changed as appropriate depending on design of the liquid crystal display device 1.

The radiator plate 8 is a metal plate to which the light emitting diode substrate 7 is mounted and which retains the reflection sheet 6. The radiator plate 8 itself is fixed to the lower frame 9. It is preferred that the material of the radiator plate 8 be high in thermal conductivity, and various kinds of metal and alloy may be suitable for use. In this embodiment, aluminum is used. A formation method for the radiator plate 8 is not particularly limited, and any method such as pressing and cutting may be used. In this embodiment, the radiator plate 8 is obtained by an extrusion molding method.

Figure 3:
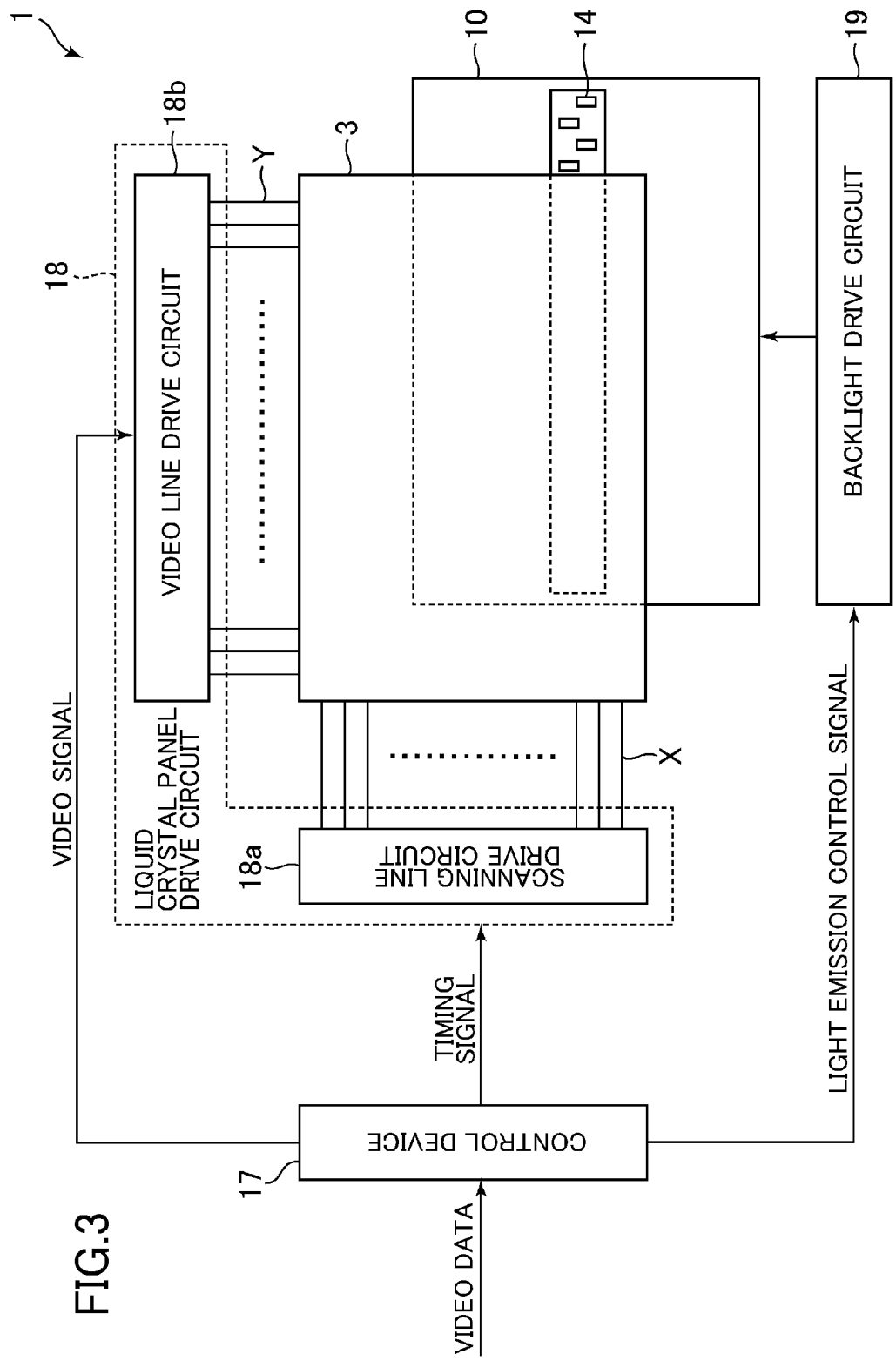
FIG. 3 is a configuration diagram illustrating a configuration of the liquid crystal display device.

FIG. 3 is a configuration diagram illustrating a configuration of the liquid crystal display device 1. Referring to FIG. 3, functions of respective members of the liquid crystal display device 1 are described below.

The liquid crystal panel 3 has a rectangular shape, the lengths of which in the horizontal direction (left-right direction in FIG. 3) and the vertical direction (up-down direction in FIG. 3) are determined depending on the intended use of the liquid crystal display device 1. The liquid crystal panel 3 may have a horizontally-elongated shape (the length in the horizontal direction is longer than the length in the vertical direction) or a vertically-elongated shape (the length in the horizontal direction is shorter than the length in the vertical direction). Alternatively, the lengths in the horizontal direction and the vertical direction may be equal to each other. In this embodiment, the liquid crystal display device 1 is assumed to be used for a television set, and hence the liquid crystal panel 3 has a horizontally-elongated shape.

The liquid crystal panel 3 includes a pair of transparent substrates. On a TFT substrate as one of the transparent substrates, a plurality of scanning signal lines X and a plurality of video signal lines Y are formed. The scanning signal lines X and the video signal lines Y are provided orthogonal to each other to form a grid pattern. A region surrounded by two adjacent scanning signal lines X and two adjacent video signal lines Y corresponds to one pixel.

Figure 4:
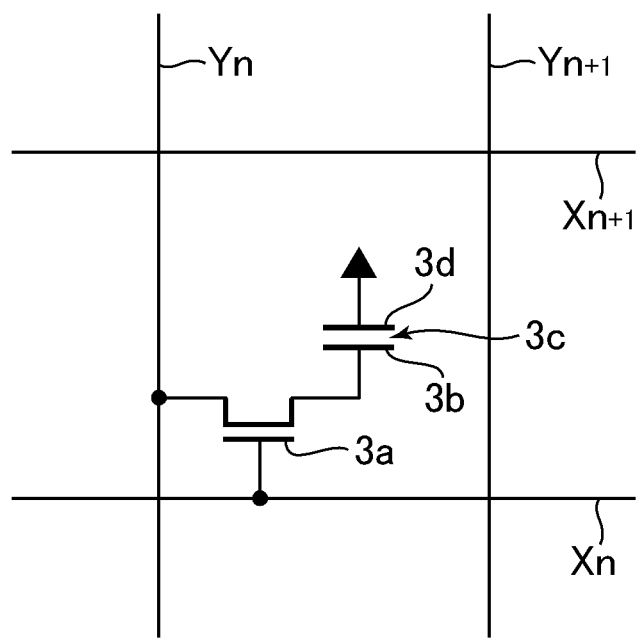
FIG. 4 illustrates a circuit diagram of one pixel formed in a liquid crystal panel.

FIG. 4 illustrates a circuit diagram of one pixel formed in the liquid crystal panel 3. In FIG. 4, a region surrounded by scanning signal lines Xn and Xn+1 and video signal lines Yn and Yn+1 corresponds to one pixel. The pixel focused here is driven by the scanning signal line Xn and the video signal line Yn. On the TFT substrate side of each of the pixels, a thin film transistor (TFT) 3a is provided. The TFT 3a is turned ON by a scanning signal input from the scanning signal line Xn. The video signal line Yn applies a voltage (signal representing a gradation value for each pixel) to a pixel electrode 3b of the pixel via the ON-state TFT 3a.

On the other hand, a color filter is formed on a color filter substrate as the other of the transparent substrates, and liquid crystal 3c is sealed between the TFT substrate and the color filter substrate. Then, a common electrode 3d is formed so as to form a capacitance with the pixel electrode 3b via the liquid crystal 3c. The common electrode 3d is electrically connected to a common potential. Accordingly, depending on the voltage applied to the pixel electrode 3b, an electric field between the pixel electrode 3b and the common electrode 3d changes, thereby changing the orientation state of the liquid crystal 3c to control the polarization state of light beams passing through the liquid crystal panel 3. Polarization filters are respectively adhered to a display surface of the liquid crystal panel 3 and a rear surface thereof, which is the opposite surface of the display surface. With this, each pixel formed in the liquid crystal panel 3 functions as an element that controls light transmittance. Then, the light transmittance of each pixel is controlled in accordance with input image data, to thereby form an image. Note that, in the liquid crystal panel 3, a region in which the pixels are formed is referred to as an image formation region.

Note that, the common electrode 3d may be provided in either the TFT substrate or the color filter substrate. How to dispose the common electrode 3d depends on the liquid crystal driving mode. For example, in an in-plane switching (IPS) mode, the common electrode 3d is provided on the TFT substrate. In a vertical alignment (VA) mode or a twisted nematic (TN) mode, the common electrode 3d is provided on the color filter substrate. This embodiment uses the IPS mode, where the common electrode 3d is provided on the TFT substrate. Further, the transparent substrates of this embodiment are formed of glass, but other materials such as a resin may be used.

Returning to FIG. 3, into a control device 17, video data received by a tuner or an antenna (not shown) or video data generated in a different device such as a video reproducing device is input. The control device 17 may be a microcomputer including a central processing unit (CPU) and a memory such as a read only memory (ROM) and a random access memory (RAM). The control device 17 performs various types of image processing, such as color adjustment, with respect to the input video data, and generates a video signal representing a gradation value for each of the pixels. The control device 17 outputs the generated video signal to a video line drive circuit 18b. Further, the control device 17 generates, based on the input video data, a timing signal for synchronizing the video line drive circuit 18b, a scanning line drive circuit 18a, and a backlight drive circuit 19, and outputs the generated timing signal to the respective drive circuits.

Note that, the present invention is not intended to limit the form of the control device 17 particularly.

For example, the control device 17 may be constituted by a plurality of large scale integrations (LSIs) or a single LSI. Further, the control device 17 may not be configured to synchronize between the backlight drive circuit 19 and the other circuits.

The backlight drive circuit 19 is a circuit for supplying a current necessary for the plurality of light emitting diodes 14 which are light sources of the backlight unit 10. In this embodiment, the control device 17 generates a signal for controlling brightness of the light emitting diode 14 based on input video data, and outputs the generated signal toward the backlight drive circuit 19. Then, in accordance with the generated signal, the backlight drive circuit 19 controls an amount of current flowing through the light emitting diode 14 and adjusts the brightness of the light emitting diode 14. The brightness of the light emitting diodes 14 may be adjusted for each of the light emitting diodes 14, or the plurality of light emitting diodes 14 may be divided into some groups and the brightness may be adjusted for each of the groups. Note that, as a method of controlling the brightness of the light emitting diode 14, a pulse width modulation (PWM) method may be employed, in which the brightness is controlled based on a light emission period with a constant current amount. As an alternative method, the current amount may be set constant so as to obtain light with constant light intensity, without controlling the brightness of the light emitting diode 14.

The scanning line drive circuit 18a is connected to the scanning signal lines X formed on the TFT substrate. The scanning line drive circuit 18a selects one of the scanning signal lines X in order in response to the timing signal input from the control device 17, and the selected scanning signal line X is applied with a voltage. When the voltage is applied to the scanning signal line X, the TFTs connected to the scanning signal line X are turned ON.

The video line drive circuit 18b is connected to the video signal lines Y formed on the TFT substrate. In conformity to the selection of the scanning signal line X by the scanning line drive circuit 18a, the video line drive circuit 18b applies, to each of the TFTs provided to the selected scanning signal line X, a voltage corresponding to the video signal representing the gradation value of each of the pixels.

Note that, in this embodiment, the control device 17 and the backlight drive circuit 19 illustrated in FIG. 3 are both formed on the control board 13 of FIG. 2. Further, a liquid crystal panel drive circuit 18 constituted by the scanning line drive circuit 18a and the video line drive circuit 18b is formed on flexible printed circuits (FPCs) electrically connected to the liquid crystal panel 3 (FIG. 3), or formed on a substrate constituting the liquid crystal panel 3 (so-called system-on-glass (SOG)). Note that, the arrangement described above is an example, and the respective circuits are provided at any portions.

Figure 5:
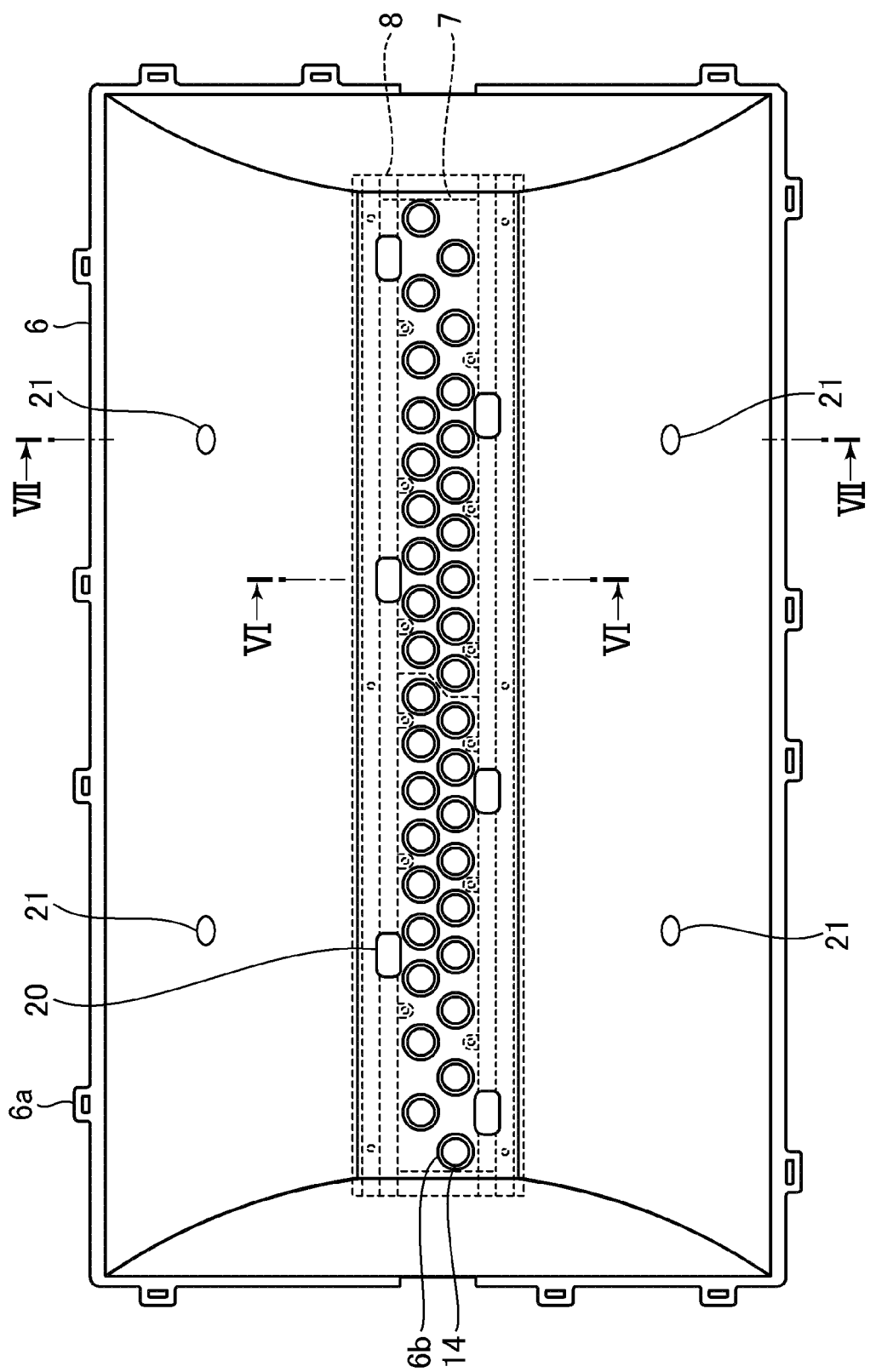
FIG. 5 is a view illustrating a reflection sheet, a light emitting diode substrate, and a radiator plate of the liquid crystal display device as viewed from the front surface side.

FIG. 5 is a view illustrating the reflection sheet 6, the light emitting diode substrate 7, and the radiator plate 8 of the liquid crystal display device 1 as viewed from the front surface side. Note that, in FIG. 5, portions of the light emitting diode substrate 7 and the radiator plate 8 which are hidden behind the reflection sheet 6 are illustrated by broken lines.

On the periphery of the reflection sheet 6, an appropriate number of fixing portions 6a protruding in a tongue shape are provided at appropriate intervals. The fixing portions 6a are used for fixing a peripheral portion of the reflection sheet 6, and in this embodiment, the fixing portions 6a are each provided with a hole for hooking therein a protrusion (not shown)

provided to the intermediate frame 4 for fixation. However, the structure of fixing the peripheral portion of the reflection sheet 6 may be of any type.

Further, in a region of the center portion of the reflection sheet 6 in the width direction, holes 6b for exposing the light emitting diodes 14 to the front surface side of the reflection sheet 6 are provided corresponding to the array of the light emitting diodes 14. As illustrated in FIG. 5, the light emitting diodes 14 and the holes 6b are arrayed along the longitudinal direction. In this embodiment, the light emitting diodes 14 and the holes 6b are arrayed in two rows in the width direction, and the light emitting diodes 14 and the holes 6b belonging to different rows are arrayed in a staggered manner as illustrated in FIG. 5. Further, the array density of the light emitting diodes 14 is high around the center portion of the reflection sheet 6 in the longitudinal direction and low in the vicinity of both end portions thereof. That is, the interval between adjacent light emitting diodes 14 is larger in the peripheral portion of the image formation region than in the center portion of the image formation region. Note that, in FIG. 5, only representative one of the light emitting diodes 14 and only representative one of the holes 6b are denoted by symbols.

The light emitting diode substrate 7 is fixed onto the radiator plate 8, the length of which in the width direction is larger than that of the light emitting diode substrate 7. In the liquid crystal display device 1 according to this embodiment, the light emitting diodes 14 are disposed in a concentrated manner in the vicinity of the center of the liquid crystal display device 1 in the width direction. The entire image formation region is irradiated by the light emitting diodes 14 that are disposed in a concentrated manner, and hence light intensity of each light emitting diode 14 is large. Accordingly, the amount of generated heat per unit area in the region where the light emitting diodes 14 are disposed is increased. In order to dissipate the heat efficiently, the area of the radiator plate 8 having superior heat conductivity is increased to be larger than that of the light emitting diode substrate 7. The reflection sheet 6 is fixed to the radiator plate 8 by fixtures 20 in the vicinity of the center in the width direction. Further, in a curved portion in which the reflection sheet 6 is curved, supports 21 for supporting the reflection sheet 6 are provided.

Figure 6:
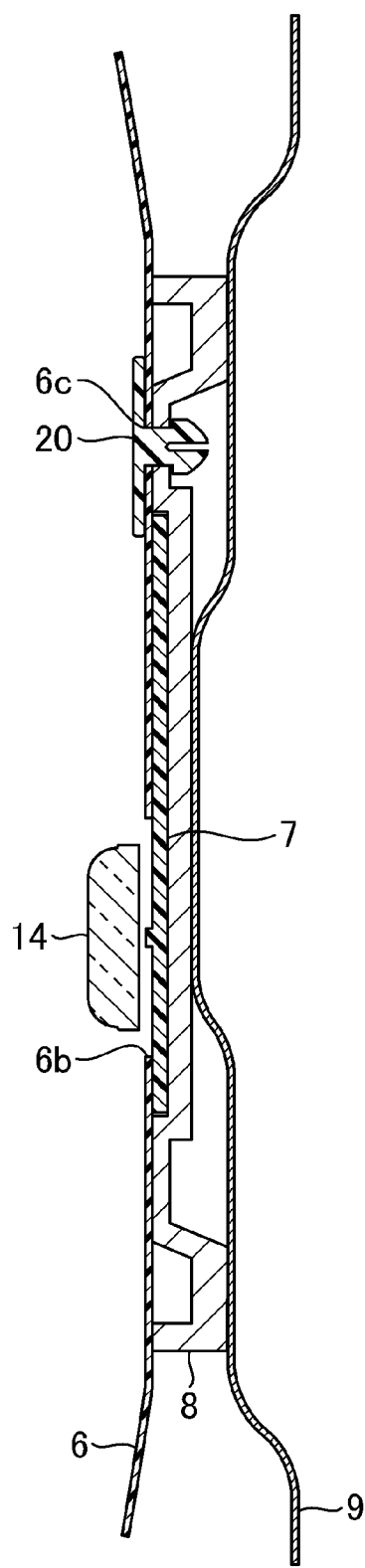
FIG. 6 is a partial enlarged cross-sectional view taken along the line VI-VI of FIG. 5.

FIG. 6 is a partial enlarged cross-sectional view taken along the line VI-VI of FIG. 5. In FIG. 6, the lower frame 9 is also illustrated. The left side in FIG. 6 is the front surface side, and the right side in FIG. 6 is the rear surface side. FIG. 6 illustrates how the light emitting diode 14 mounted on the light emitting diode substrate 7 is exposed on the front surface side of the reflection sheet 6 while passing through the hole 6b provided in the reflection sheet 6. The reflection sheet 6 is further provided with a fixing hole 6c. With the fixture 20 passing through the fixing hole 6c, the reflection sheet 6 is fixed to the radiator plate 8 in a region on the outer side of the light emitting diode substrate 7 in the width direction. The size of the fixing hole 6c is slightly larger than the cross section of a passing portion of the fixture 20, in order to allow for a relative change in dimensions of the respective members caused by different linear expansion coefficients when the light emitting diode 14 generates heat to cause thermal expansion. Further, the front surface of the light emitting diode substrate 7 and the front surface of the radiator plate 8 are substantially flush with each other, and hence, on the front surface side thereof, the reflection sheet 6 is retained flat without waving.

The fixture 20 may be of any type and is not particularly limited. In this embodiment, a fixing pin having a snap-in mechanism is used as illustrated in FIG. 6, which facilitates fixation of the reflection sheet 6. It is preferred that the material of the fixture 20 be the same as that of the reflection sheet 6 or be a similar white synthetic resin. This minimizes brightness unevenness at the position where the fixture 20 is disposed. Further, the height of a portion of the fixture 20 on the front surface side, namely a so-called head portion of the fixing pin, is set to be small as much as possible so that the position of the front surface of the fixture 20 is located on the rear surface side with respect to the position of the front surface of the light emitting diode 14. This prevents a shaded region which is not irradiated with sufficient light from the light emitting diode 14 from being formed on the outer side of the fixture 20 in the vertical direction.

Figure 7:
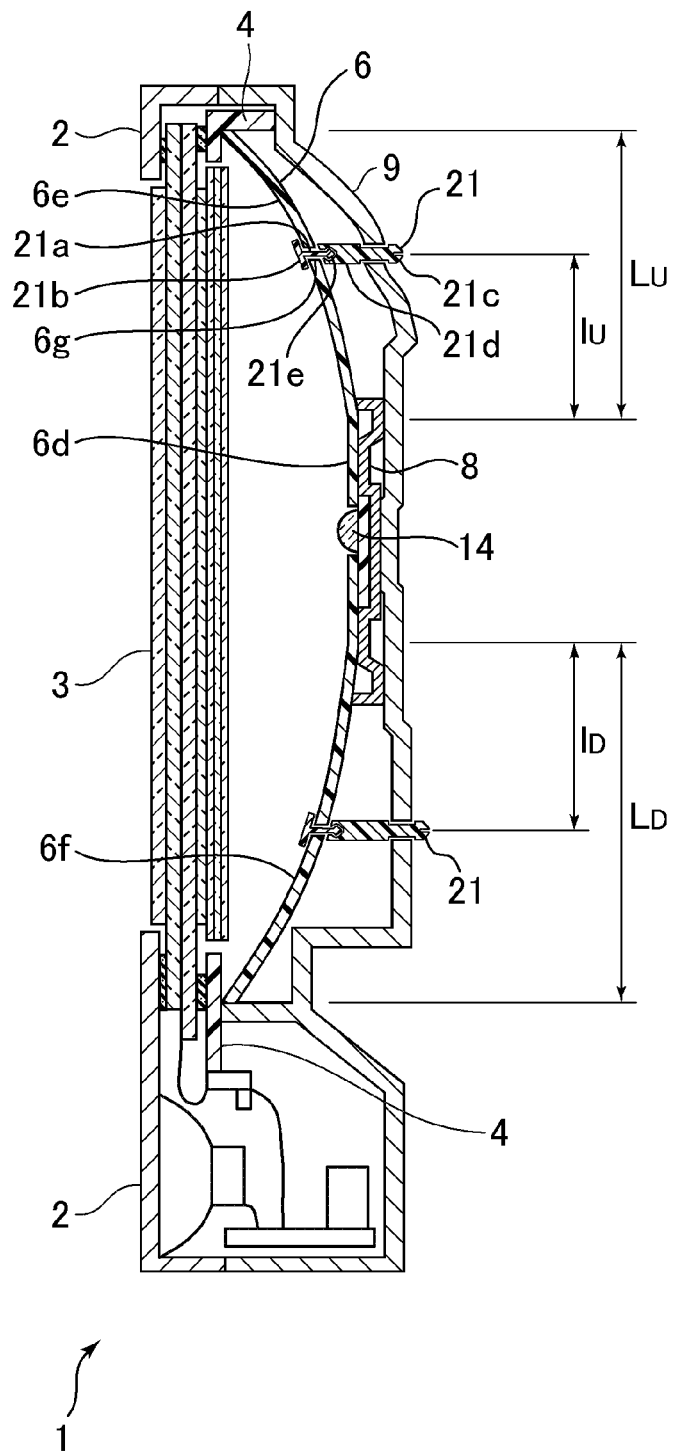
FIG. 7 is a schematic cross-sectional view of the liquid crystal display device taken along the line VII-VII of FIG. 5.

FIG. 7 is a schematic cross-sectional view of the liquid crystal display device 1 taken along the line VII-VII of FIG. 5. FIG. 7 illustrates the cross section of the support 21 for supporting the reflection sheet 6 at a curved portion thereof.

In the cross section in the vertical direction, the reflection sheet 6 is provided with a flat portion 6d at the center. The flat portion 6d is a portion to be fixed to the radiator plate 8 as described above, and the light emitting diode 14 is disposed in the flat portion 6d. On the upper and lower sides of the flat portion 6d, an upper curved portion 6e and a lower curved portion 6f, which are portions curved so as to be concave toward the liquid crystal panel 3, are provided. The support 21 is a member for supporting the curved portion at a desired position in order to prevent brightness unevenness caused by warp of the curved portion.

Specifically, the support 21 regulates the positions of the curved portion in the vertical and horizontal directions by a support shaft 21a which passes through an opening 6g provided in the curved portion of the reflection sheet 6, and further regulates the position of the curved portion in the front and back direction by an expanded width portion 21b which is provided at the edge of the support shaft 21a on the liquid crystal panel 3 side. The size of the opening 6g is slightly larger than the size of the cross section of the support shaft 21a, in order to absorb a dimension error caused by different linear expansion coefficients during thermal expansion similarly to the above-mentioned fixture 20 (see FIG. 6). Further, the expanded width portion 21b is exposed on the front surface of the reflection sheet 6, and has a flat shape in which the angle of the front surface is substantially the same as that of the curved portion. This prevents a shaded region which is not irradiated with sufficient light from the light emitting diode 14 from being formed on the outer side of the expanded width portion 21b in the vertical direction. Note that, it is also preferred that the material of the support 21 be the same as that of the reflection sheet 6 or be a similar white synthetic resin.

In this embodiment, the support 21 is fixed to the lower frame 9. The support 21 may be of any type and is not particularly limited. In this embodiment, the support 21 is divided into two portions, that is, the support shaft 21a and an intermediate shaft 21d. The intermediate shaft 21d has a snap-in mechanism 21c at the edge thereof and is fixedly mounted in an appropriate fixing hole of the lower frame 9. Then, the intermediate shaft 21d and the support shaft 21a are coupled to each other by a snap-in mechanism 21e, which is provided at the edge of the support shaft 21a, so as to sandwich the reflection sheet 6.

In the case where the position of the support 21 in the vertical direction is close to the light emitting diode 14, even if the expanded width portion 21b has a flat shape, the influence of the expanded width portion 21b on reflection/diffusion of light beams cannot be neglected, and uniform illumination cannot be obtained. As countermeasures, it is preferred to satisfy $l_U \geq L_U/2$ and $l_D \geq L_D/2$, where $L_U$ represents the length of the upper curved portion 6e in the vertical direction, $L_D$ represents the length of the lower curved portion 6f in the vertical direction, $l_U$ represents a vertical distance from a lower end of the upper curved portion 6e to the support 21 provided at the upper curved portion 6e, and $l_D$ represents a vertical distance from an upper end of the lower curved portion 6f to the support 21 provided at the lower curved portion 6f. In other words, it is preferred to provide the support 21 in a region in an upper half of the upper curved portion 6e in the height direction or in a region in a lower half of the lower curved portion 6f in the height direction. Note that, from the specific studies by the inventors of the present invention, the influence of the supports 21 can be neglected as long as $l_U$ and $l_D$ are about 100 mm or more. However, this numerical value is considered to be varied depending on the size of the liquid crystal display device 1, the shape of each member, and the like.

Note that, in this embodiment, the supports 21 are provided at both the upper curved portion 6e and the lower curved portion 6f, but the present invention is not limited thereto, and the support 21 may be provided at only one of the curved portions as described later.

Figure 8:
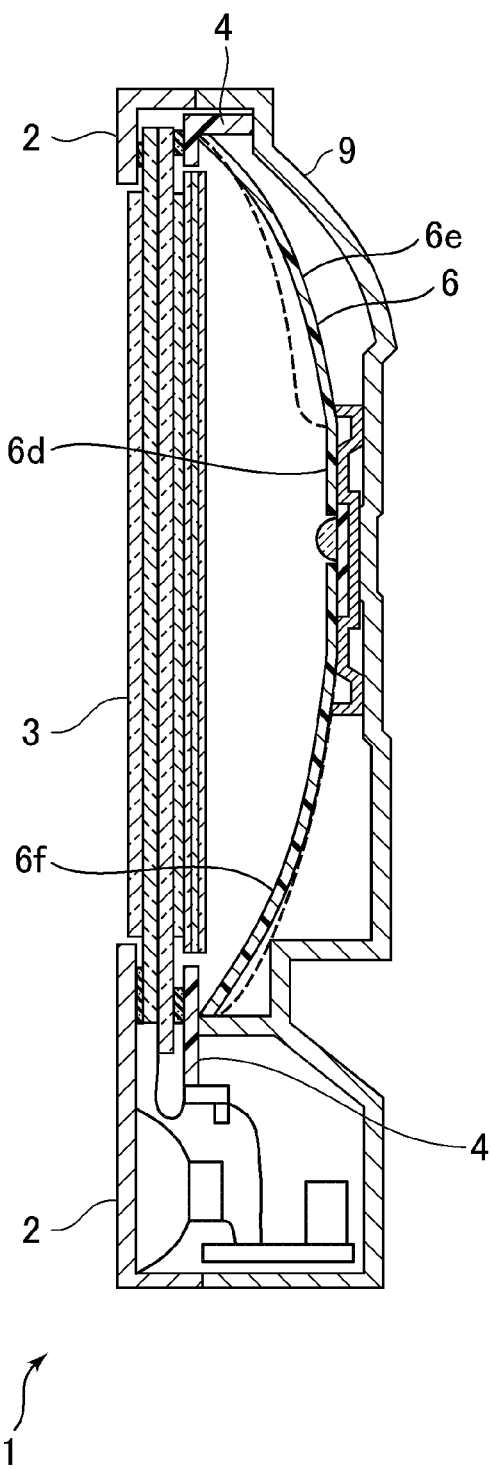
FIG. 8 is a view illustrating a deformation of the reflection sheet.

By the way, $l_U$ and $l_D$ are not necessarily the same value, and it is preferred to set the positions of the supports 21 so that the supports 21 may minimize the deformation of the reflection sheet 6. FIG. 8 is a view illustrating a deformation of the reflection sheet 6. If the reflection sheet 6 is not supported by the support 21, the curved portion of the reflection sheet 6 is deformed. This deformation can be indicated as the broken line of FIG. 8 when exaggerated. That is, in the upper curved portion 6e, the deformation amount is larger in the lower part of the upper curved portion 6e.

On the other hand, also in the lower curved portion 6f, the deformation amount is larger in the lower part of the lower curved portion 6f. In this case, in order to reduce the deformation amount of the reflection sheet 6, it is effective to support the reflection sheet 6 at a position at which the deformation amount is large in an unsupported state. It is therefore desired to dispose the supports 21 at a position closer to the lower side of the upper curved portion 6e and a position closer to the lower side of the lower curved portion 6f. That is, it is desired that the support 21 for the upper curved portion 6e be disposed closer to the flat portion 6d and that the support 21 for the lower curved portion 6f be disposed farther from the flat portion 6d. Referring to FIG. 7, it is preferred to satisfy $l_U \leq l_D$, that is, it is preferred that the distance $l_U$ of the support 21 disposed at the upper curved portion 6e from the lower end of the upper curved portion 6e be equal to or smaller than the distance $l_D$ of the support 21 disposed at the lower curved portion 6f from the upper end of the lower curved portion 6f. It is preferred to determine specific values of $l_U$ and $l_D$ in consideration of the influence of the supports 21 on light beams and the influence of the deformation of the reflection sheet 6 on light beams, and the values may be determined experimentally or by computer simulation.

Figure 9:
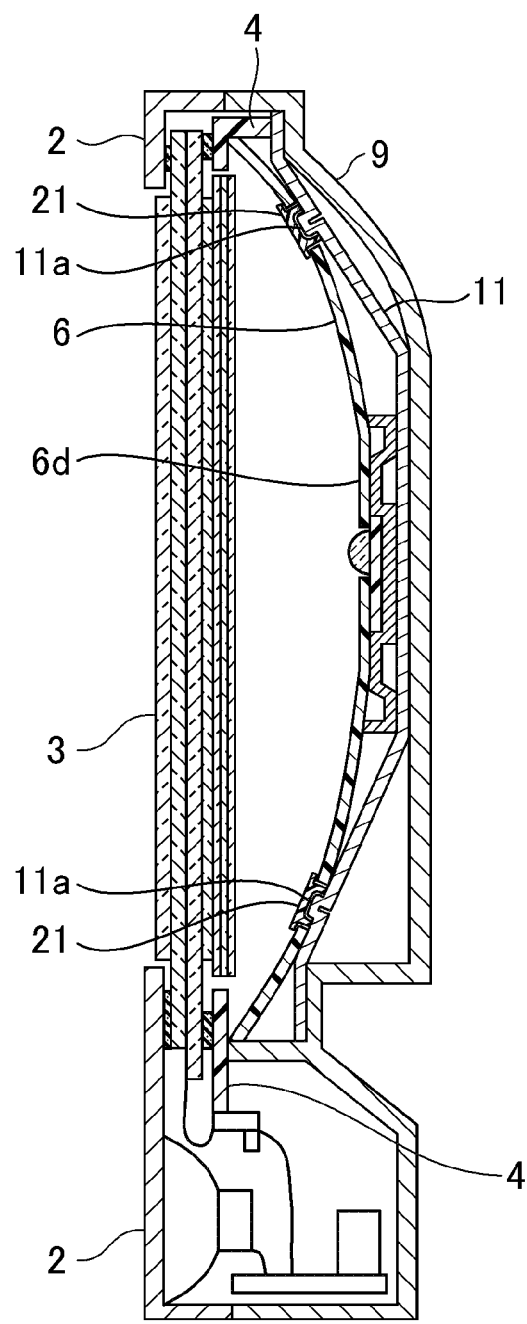
FIG. 9 is a cross-sectional view of a liquid crystal display device according to a modified example in which supports are fixed to a reinforcing member.

By the way, in the liquid crystal display device 1 according to the embodiment described above, as illustrated in FIG. 7, the supports 21 are each fixed to the lower frame 9 by the snap-in mechanism 21c. Accordingly, the snap-in mechanism 21c is exposed on the rear surface side of the lower frame 9. FIG. 9 is a cross-sectional view of a liquid crystal display device 1 according to a modified example in which the supports 21 are fixed to the reinforcing member 11. As illustrated in FIG. 1, the reinforcing member 11 is mounted on the inner side of the outer frame, that is, on the side facing the liquid crystal panel 3. Therefore, when the supports 21 are fixed to the reinforcing member 11 as in this modified example, the supports 21 are not exposed on the rear surface of the lower frame 9. Note that, in the modified example illustrated in FIG. 9, the reinforcing member 11 has a convex portion 11a shaped as a stud of a snap button, which is formed by drawing deformation. The convex portion 11a is engaged with a concave portion shaped as a socket of the snap button, which is provided on the rear surface side of the support 21. In this manner, the support 21 is fixed to the reinforcing member 11 in the state in which the reflection sheet 6 is sandwiched therebetween. Note that, the method of mounting the support 21 to the reinforcing member 11 is not limited to the above, and any publicly known method can be used.

In the liquid crystal display device 1 according to this embodiment described above, as illustrated in FIG. 5, the same number of the supports 21, specifically, two supports 21 are provided at the upper curved portion and two supports 21 are provided at the lower curved portion so as to be symmetric in the horizontal direction and so that the supports 21 provided at the upper curved portion are disposed at the same position in the horizontal direction and the supports 21 provided at the lower curved portion are disposed at the same position in the horizontal direction. However, the present invention is not limited thereto, and the number and positions of the supports 21 may be determined as appropriate.

For example, as illustrated in FIG. 10A, the supports 21 may be provided only at the upper curved portion. The reason is that the deformation amount of the reflection sheet 6 is larger at the upper curved portion 6e as illustrated in FIG. 8, and hence the support 21 does not need to be provided at the lower curved portion 6f as long as the deformation amount of the lower curved portion 6f is within a practically allowable level.

Alternatively, as illustrated in FIG. 10B, the number of the supports 21 disposed at the upper curved portion and the number of the supports 21 disposed at the lower curved portion may be different. In the example illustrated in FIG. 10B, the number of the supports 21 disposed at the upper curved portion is two and the number of the supports 21 disposed at the lower curved portion is one. This is because, as described above, the upper curved portion has a larger deformation amount than that of the lower curved portion.

Still alternatively, as illustrated in FIG. 10C, the supports 21 may be provided so as to be laterally asymmetric. It is preferred to employ this arrangement in the case where the number of the supports 21 is reduced and the supports 21 are fixed to the reinforcing member 11 (see FIGS. 1 and 9).

Next, a liquid crystal display device 1 according to a second embodiment of the present invention is described. The liquid crystal display device 1 according to this embodiment further has a structure for preventing warpage of the optical sheet 5 in addition to the structure of the preceding embodiment. This is the difference from the first embodiment and the rest is the same. Therefore, overlapping components are denoted by the same reference symbols as those of the preceding embodiment, and detailed description thereof is omitted.

Figure 11:
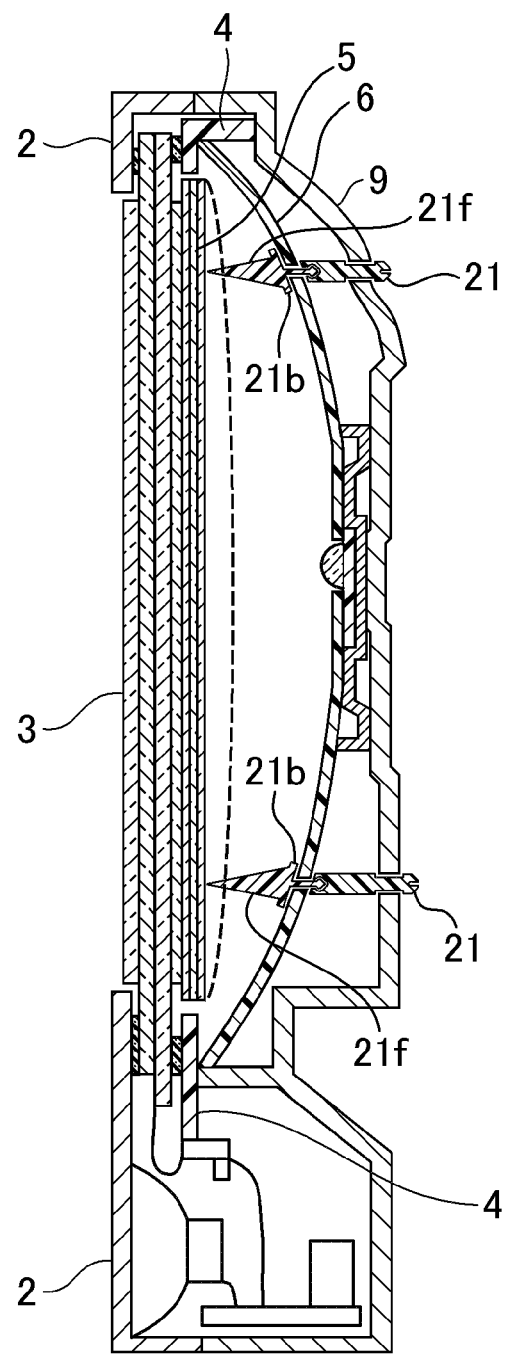
FIG. 11 is a cross-sectional view of a liquid crystal display device according to a second embodiment of the present invention, illustrating a cross section corresponding to FIG. 7 of the first embodiment.

FIG. 11 is a cross-sectional view of the liquid crystal display device 1 according to the second embodiment, illustrating a cross section corresponding to FIG. 7 of the preceding embodiment. As the size of the liquid crystal display device 1 becomes larger, the size of the optical sheet 5 also becomes larger. Accordingly, there is a possibility that the optical sheet 5 may be warped by its own weight and hence uniform illumination cannot be obtained. As countermeasures, in this embodiment, a support column 21f that abuts against the optical sheet 5 to support the optical sheet 5 is provided so as to extend from the front surface of the expanded width portion 21b of the support 21 in the direction facing the liquid crystal panel 3. The support column 21f can prevent a deformation of the optical sheet 5 in the thickness direction (left-right direction of FIG. 11), thereby preventing warpage. In order to minimize the influence of the support column 21f on illumination, the support column 21f has a tapered shape as illustrated in FIG. 11. That is, the support column 21f has a tapered shape in which the cross-sectional area thereof decreases toward the liquid crystal panel 3. The cross-sectional shape of the support column 21f is not particularly limited, but is desired to have little influence on illumination. In this embodiment, the cross-sectional shape of the support column 21f is circular. Therefore, the support column 21f of this embodiment has a conical shape. With this, light beams that have entered the support column 21f are uniformly scattered to the surroundings of the support column 21f, and hence brightness unevenness is less likely to occur.

Further, the support column 21f and the optical sheet 5 are not fixed to each other but the support column 21f only abuts against the optical sheet 5. Accordingly, by the support column 21f, a displacement of the optical sheet 5 in the direction away from the liquid crystal panel 3 is regulated, but a displacement of the optical sheet 5 in the direction approaching the liquid crystal panel 3 is not regulated. Note that, FIG. 11 illustrates the optical sheet 5 as if the optical sheet 5 is in close contact with the liquid crystal panel 3, but strictly, a slight gap is provided between the optical sheet 5 and the liquid crystal panel 3.

Regarding this point, the optical sheet 5 is slightly warped in a state of being free from restriction, and the direction of the warpage is such a direction that the optical sheet 5 has a concave surface facing the liquid crystal panel 3. That is, when the optical sheet 5 is free from restriction by the support column 21f, the optical sheet 5 has a shape illustrated in the broken line of FIG. 11. If the optical sheet 5 is warped in this direction, a force always acts in a direction in which the optical sheet 5 is pressed against the support column 21f, and hence the optical sheet 5 is never displaced in the direction approaching the liquid crystal panel 3.

Note that, in the case where the optical sheet 5 includes a plurality of sheets, it is sufficient that at least one of the sheets is warped as described above. In this embodiment, a diffusion sheet is the optical sheet 5 which is warped.

Note that, the embodiments described above are a specific example for describing the present invention, and the present invention is not intended to be limited to the embodiments.

For example, in the embodiments, the light emitting diode 14 includes the lens, but the lens is not always necessary when light emitted from the light emitting diode element diffuses sufficiently. Further, in the embodiments, the liquid crystal display device 1 is structured to have only a single light emitting diode substrate 7 at the center of the liquid crystal display device 1 in the vertical direction, but maybe structured to have two or more light emitting diode substrates 7 which are disposed side by side in the vertical direction thereof. Still further, the number and arrangement of the light emitting diodes 14 and the number, shape, and arrangement of other members are not limited to the ones described in the embodiments, and an appropriate number, shape, and arrangement are intended to be optimized as necessary.

In other words, while there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
    a liquid crystal panel;
    a reflection sheet, which is disposed on a rear surface side of the liquid crystal panel and, as viewed in vertical cross section, comprises a flat portion and curved portions extending from a periphery of the flat portion toward the liquid crystal panel so as to define a single concave surface facing the liquid crystal panel, a periphery of the concave surface substantially corresponding to a periphery of the liquid crystal panel;
    a light emitting diode substrate on which a plurality of light emitting diodes are disposed along a horizontal direction;
    a support for supporting the reflection sheet at at least one of the curved portions of the reflection sheet, at a position intermediate the flat portion and the periphery of the concave surface; and
    a radiator plate, having a higher thermal conductivity than that of the light emitting diode substrate, mounted to the flat section of the reflector plate.

2. The liquid crystal display device according to claim 1, wherein:
    the reflection sheet comprises:
        an upper curved portion positioned on an upper side of the plurality of light emitting diodes, and
        a lower curved portion positioned on a lower side of the plurality of light emitting diodes; and
    the support is provided in at least one of a region in an upper half of the upper curved portion in a height direction and a region in a lower half of the lower curved portion in the height direction.

3. The liquid crystal display device according to claim 2, wherein:
    a plurality of the supports are provided, with at least one support disposed at the upper curved portion and at least one support diposed at the lower curved portion, and
    a distance of the support disposed at the upper curved portion from a lower end of the upper curved portion is equal to or smaller than a distance of the support disposed at the lower curved portion from an upper end of the lower curved portion.

4. The liquid crystal display device according to claim 1, further comprising an outer frame which is disposed on a rear surface side of the reflection sheet,
    wherein the support is fixed to the outer frame.

5. The liquid crystal display device according to claim 1, further comprising:
    an outer frame which is disposed on a rear surface side of the reflection sheet; and
    a reinforcing member which is mounted on the outer frame on a side facing the liquid crystal panel,
    wherein the support is fixed to the reinforcing member.

6. The liquid crystal display device according to claim 1, wherein:
    the support comprises:
        a support shaft which passes through an opening provided in the reflection sheet; and
        an expanded width portion which is provided at an edge of the support shaft; and
    the expanded width position is exposed on a front surface of the reflection sheet.

7. The liquid crystal display device according to claim 6, further comprising an optical sheet which is disposed on the rear surface side of the liquid crystal panel, wherein the support further comprises a support column, which extends from the extended width portion in a direction facing the liquid crystal panel, for supporting the optical sheet.

8. The liquid crystal display device according to claim 7, wherein the support column has a tapered shape in which a cross-sectional area thereof decreases toward the liquid crystal panel.

9. The liquid crystal display device according to claim 8, wherein the support column has a conical shape.

10. The liquid crystal display device according to claim 7, wherein, in a state in which the optical sheet is free from restriction, the optical sheet is warped so as to have a concave surface facing the liquid crystal panel.

11. The liquid crystal display device according to claim 6, wherein the support is white.

\* \* \* \* \*